(12) United States Patent
Dino et al.

(10) Patent No.: US 6,187,719 B1
(45) Date of Patent: Feb. 13, 2001

(54) LESS TEMPERATURE DEPENDENT DRILLING FLUIDS FOR USE IN DEEP WATER AND DIRECTIONAL DRILLING AND PROCESSES FOR PROVIDING LESS TEMPERATURE DEPENDENT RHEOLOGICAL PROPERTIES TO SUCH DRILLING FLUIDS

(75) Inventors: David Dino, Cranbury; Charles Cody, Robbinsville; Edward Magauran, Westampton; Araxi Chiavoni, Trenton, all of NJ (US)

(73) Assignee: Rheox, Inc., Highstown, NJ (US)

( * ) Notice: Under 35 U.S.C. 154(b), the term of this patent shall be extended for 0 days.

(21) Appl. No.: 09/066,844

(22) Filed: Apr. 28, 1998

(51) Int. Cl.$^7$ .............................. E21B 43/22; E21B 43/27; C09K 7/02; C09K 7/06
(52) U.S. Cl. .......................... 507/129; 507/138; 166/270
(58) Field of Search ..................................... 507/129, 138; 166/270

(56) References Cited

U.S. PATENT DOCUMENTS

| | | | |
|---|---|---|---|
| 2,355,356 | * 9/1944 | Young, Jr. | 564/490 |
| 2,775,617 | * 12/1956 | Shapiro et al. | 564/296 |
| 3,136,819 | * 6/1964 | Shapiro et al. | 564/473 |
| 3,252,820 | * 5/1966 | Vignolo et al. | 106/272 |
| 3,977,894 | * 8/1976 | White et al. | 106/468 |
| 4,105,578 | * 8/1978 | Finlayson et al. | 516/101 |
| 4,287,086 | * 9/1981 | Finlayson et al. | 516/101 |
| 4,402,881 | * 9/1983 | Alther | 507/129 |
| 4,435,636 | * 3/1984 | Royston | 219/230 |
| 4,474,705 | * 10/1984 | Clay et al. | 507/129 |
| 4,517,112 | * 5/1985 | Mardis et al. | 516/100 |
| 4,631,136 | * 12/1986 | Jones, III | 507/138 |
| 4,664,820 | * 5/1987 | Magauran et al. | 508/136 |
| 5,021,170 | * 6/1991 | Shumate et al. | 507/122 |
| 5,034,136 | * 7/1991 | Cody et al. | 210/691 |
| 5,336,647 | * 8/1994 | Nae et al. | 501/146 |
| 5,340,390 | * 8/1994 | Magauran et al. | 106/244 |
| 5,634,969 | * 6/1997 | Cody et al. | 106/287.17 |
| 5,710,108 | * 1/1998 | McNally et al. | 507/110 |

FOREIGN PATENT DOCUMENTS 92-19693 * 11/1992 (WO) .

* cited by examiner

Primary Examiner—Jill Warden
Assistant Examiner—LaToya J. Cross
(74) Attorney, Agent, or Firm—Michael J. Cronin

(57) ABSTRACT

This invention is a process for improving the rheological properties of oil well drilling fluids particularly useful for oil-based invert emulsion types of drilling fluids. The process is particularly useful when drilling in deep water from an off-shore drilling rig. The new process uses as a rheological viscosifier, for such fluids, a composition which is a mixture of organoclays and castor wax and/or castor was type rheological additives, which when added to a drilling fluid at from about 0.5 and 5% by weight, creates an inventive drilling fluid compositions less sensitive to the variety of different and varying, very hot and very cold temperatures found in the drilling hole, and in the long stem of drilling pipe. The present invention also relates to the discovery of oil based invert emulsion drilling fluids that exhibit greater efficiency and provides more stable drilling fluid viscosity and anti-settling performance over varying temperatures when compared to conventional fluids containing organoclays. Conventional organophilic clays, when used as rheological additives in oil based invert muds, display marked viscosity increases in the mud when these muds are cooled through the temperature range found today in deep water and directional drilling, whereas muds prepared according to the present invention are dramatically more viscosity stable over the same temperature ranges. As a result, the fluids of this invention are ideal candidates for reduced temperature applications such ad deep water drilling and directional drilling. Organoclays, also known as organophilic clays, are the reaction product of smectite-type clays (most often bentonite and hectorite) quaternary ammonium compounds (also called cationic organic salts). Castor wax type rheological additives are derivative of castor oil produced by the controlled hydrogenation of castor oil.

20 Claims, No Drawings

LESS TEMPERATURE DEPENDENT DRILLING FLUIDS FOR USE IN DEEP WATER AND DIRECTIONAL DRILLING AND PROCESSES FOR PROVIDING LESS TEMPERATURE DEPENDENT RHEOLOGICAL PROPERTIES TO SUCH DRILLING FLUIDS

BACKGROUND OF THE INVENTION

1. Field of the Invention

The present invention relates to improved oil based well bore fluids known in the oil service industry as drilling fluids, and, in particular, to oil based invert emulsion types of drilling fluids in which water is dispersed in an oil-based medium. The invention is particularly directed to providing enhanced viscosity and anti-settling properties to such fluids over the wide temperature ranges found in more recent drilling operations; that is, the ability of the fluids to possess the proper viscosity profile, and to retain in suspension in their structure and to convey along with the fluid, a variety of types of solid particles, the most important of which are bore-hole cuttings. These properties are particularly valuable when non-vertical directional and deep water drilling is undertaken.

2. Description of the Prior Art

The oil industry has used "drilling muds" or drilling fluids since the beginning of United States oil well drilling operations in Pennsylvania, Texas and Oklahoma. These drilling fluids are pumped under pressure down through the string of drill pipe already in the ground, then through the center of the drilling bit, and then return up through the space between the outside of the drill pipes and the borehole wall finally being brought back up to the surface. Drilling base fluids, the liquid carriers of the system, are often comprised of oils (diesel, mineral and poly(alpha-olefin)), propylene glycol, methyl glucoside, modified esters and ethers, water, and emulsions of oil and water of varying proportions.

A drilling fluid must accomplish a number of interrelated functions for it to satisfy the minimum requirements for a commercial drilling fluid. These functions can be grouped as follows:

(1) The fluid must constantly lubricate the drill bit so as to promote drilling efficiency and retard bit wear, (2) The fluid must have a proper thickness or viscosity to meet the many different criteria required by the drill owner/operator, (3) The fluid must provide filtration control, (4) The fluid must suspend and transport solid particles to the surface for screening out and disposal, and (5) The fluid must keep suspended solid particles and weighting agents (to increase specific gravity of the mud; generally barytes; a barium sulfate ore, ground to a fine particle size), when drilling is interrupted.

The above functions must be satisfactorily provided throughout the time the fluid is in the entire length of the drill hole. Since the drill hole can be as much as tens of thousands of feet long, varying and extreme temperatures are encountered, which temperature changes effect the fluid's physical properties and performance.

The interrelatedness of the above functions can be seen by the fact that the unwanted materials to be removed at the surface can include not only "cuttings" from the material through which the bit is passing, but also pieces of the drill bit itself, barytes or other weighing materials, and substances such as gellants, dissolved gases, and salts created when other fluid constituents become "spent" under the high temperatures encountered in the bottom of deep wells. Sometimes various constituents fuse into agglomerated particles using present additives if low temperatures are encountered in the "trip" back to the surface.

Finally, it should be noted that a drilling fluid must perform its various functions not only when the drill bit is actively encountering the bottom of the borehole, but also at all times and at all locations in the drill stem. In particular, cuttings must be held in suspension through their long journey back to the surface through regions of quite different and varying temperatures compared to that found in the hole at depth.

A drilling fluid is typically a thixotropic system; that is, (1) it exhibits low viscosity when sheared, such as on agitation or circulation (as by pumping or otherwise) but, (2) when such shearing action is halted, the fluid thickens to hold cuttings in place; the fluid must become thick relatively rapidly, reaching a sufficient gel strength before suspended materials fall any significant distance—and (3) this behavior must be totally reversible at all temperatures encountered. In addition, even when a free-flowing liquid, the fluid must retain a sufficiently high viscosity to carry all unwanted particulate matter from the bottom of the hole to the surface. To maintain these functions under the widely varying temperatures encountered in deep water drilling has proved extremely difficult with the use of commercial rheological drilling fluid additives presently available on the market.

One of the principal problems facing "mud chemistry" scientists is the production of thickening agents, thixotropes and drilling fluids having satisfactory dispersibility, with the necessary subsidiary thixotropic properties discussed above, while at the same time possessing critically important anti-settling properties over a wide range of temperatures. While the compositions of these various fluids is considered a "black art" to many, in reality, fluids and their additives involve highly complex chemical, physical and rheological analysis using state-of-the-art scientific apparatus and intricate mathematical calculations and modeling.

A different measure of control during drilling occurs because of wide ranges of a) encountered temperature (from as low as below 5° C. to as high as 200° C.), b) time durations, c) pressures (from only a few bars to those exerted by a column of fluid that can extend for thousands of feet) and d) drilling directions (from vertical to horizontal).

Accordingly, a search has been going on for many years for an improved additive for modifying and controlling the suspension properties of drilling fluids that would be efficient, easily handled, and readily dispersible in a broad range of drilling muds, and be usable under a broad range of temperature and pressure conditions.

Drilling Mud Circulation

As was noted above, drilling fluid is pumped under pressure down through the string of drill pipe, through the center of the drilling bit, then through the annulus between the outside of the drill stem and the borehole wall, back up to the surface. This circulation constantly removes cuttings from the instantaneous bottom of the hole, and lifts them the entire distance from this bottom to the surface for disposal. Such a distance today can be in the thousands or tens of thousands of feet and involve quite remarkable changes of temperature.

Further, it is desirable for the drilling fluid to possess less dynamic anti-settling properties when being circulated down the drill pipe and out the bit, and to have higher viscosity and anti-settling properties while rising through the annulus.

Unless the fluid removes cuttings from beneath the bit before the next bit tooth arrives, the cuttings will be reground into a finer particle size, and made more difficult to remove by screening and also materially slow down the rate, since the same material is being reground over and over again. The presence of unremoved cuttings in the fluid will decrease drilling penetration rates, with resultant increase in the overall costs of drilling the well.

Once in the annulus, the cuttings which are generally denser than the drilling mud itself, tend to settle downward under the influence of gravity. The upward velocity of the drilling fluid in the annulus must be higher than the settling rate, so as to bring the cuttings to the top of the hole. All of the above properties must largely be independent of temperature.

Off Shore Deep Water Drilling and Temperature Sensitivity

In modern times, hydrocarbon drilling for exploratory and production wells has increasingly been done from platforms located in water settings, often called off-shore drilling. Such fresh and salt water drilling employ floating barges and rigs fixed in some fashion to the submerged surface of the earth.

Economic and technical advances have recently pushed these drilling operations into deeper waters. Although advances in equipment and engineering have yielded technology capable of drilling in water depths up to 10,000 feet or more, advances required in drilling fluid technology have lagged.

A major problem with oil based drilling fluids in deepwater drilling is rheological additive temperature sensitivity over the temperature range encountered. During circulation, the drilling fluid typically reaches bottom hole temperatures of about 60° C. to 80° C. followed by cooling to lower than 5° C. in the riser during its travel upward (due to the inherent low temperature of sea water far below the ocean surface). For successful deepwater drilling, the mud needs to suspend the solids and remain pumpable with proper viscosity over these wide temperature ranges.

Drilling fluids composed of conventional organophilic clay rheological additives particularly suffer considerable viscosity build as the drilling fluid is cooled from a temperature of 60° C. to 5° C., for example. As a result of this viscosity increase, the drilling fluid, when it reaches low temperatures, is more difficult to pump, the equivalent circulating density (ECD) is increased and increased drilling fluid losses to the formation (lost circulation) frequently occur.

The invention discloses new oil based drilling fluids, particularly oil invert drilling muds, which are distinguished by improved rheological properties, high ecological acceptability, and at the same time good storage and application properties. One important area of application for the new drilling fluid systems is in off-shore wells, the aim of the invention being particularly to make available industrially usable drilling fluids with enhanced properties over a large temperature range. The use of the new drilling fluid systems has particular significance in the marine environment, but is not limited to this field. The new mud system also can be put to use in land-based drilling operations as described below.

Directional Drilling

The requirements for drilling fluids with enhanced temperature properties also has become more complex over the past decade as a result of changes in directional drilling technology, in which a well is drilled at an angle other than vertical. Such wells are also known as deviated wells.

Methods for deviating wells have changed greatly over recent years with the production of more powerful and reliable downhole motors, and the invention of more accurate techniques utilizing wireline techniques as well as the highly computerized downhole, sensing and micro reduction equipment, including improvements in sounding apparatus and microwave transmission. These techniques permit the instantaneous obtaining of data relating to down-hole conditions without the need to remove the drill string.

The advantages of directional drilling are that it allows (1) the tapping of fields which cannot effectively be reached by vertical drilling; (2) permits the use of more economical land-based equipment to explore the immediate off-shore environment; and (3) allows the drilling of multiple wells up to several miles from one another, sharing the cost of a single platform. In certain formations, increased production can be achieved by deviating the well off-verticle so as to facilitate perforation and development of a narrow producing zone, or redevelopment of a depleted formation.

Use of a downhole motor allows the hole to be deviated by the introduction of a fixed offset or bend just above the drill bit. This offset or bend can be oriented by modern MWD systems which are capable of reporting accurately the current bit and toolface hole angle and azimuth (i.e. the orientation with respect to the upper portion of the hole). It is accordingly possible to rotate the drill string until the toolface has achieved the desired direction of deviation, and then to fix the drill string in place and commence the deviation by starting the motor to extend the hole in the desired deviated direction.

There are, however, a number of inherent problems in this approach to directional drilling, which affect the requirements of a drilling mud; namely:

As in deep water drilling, increased ranges of temperatures are encountered.

The annulus carrying the mud to the surface is no longer vertical and extends to far greater distances versus vertical wells.

Gravity on a horizontal hole pulls cuttings, weighting material and particulate matter, not controlled by the drilling fluid, to the bottom side of the bore (not the bottom of the hole as in traditional drilling) and results in drag on the bore wall.

The amount of drilling mud required is increased since the distances are greater, and the time required for the mud to reach the earth's surface also increases.

Curves and kinks in the hole's direction can accumulate cuttings and additives.

In order to obviate or mitigate these problems, which can cost oil and gas companies millions of dollars per hole, it is an object of the invention to provide drilling fluids with rheological properties particularly appropriate for directional drilling apparatus in addition to the increased viscosity modification stability with temperature discussed above.

Prior Art

U.S. Pat. No. 5,021,170 describes a viscosifying gellant for oil-based well bore fluids comprising a mixture of an organoclay and a sulfonated, ethylene/propylene/5-phenyl-2-norbornene terpolymer. Japanese Patent Application No. 62-69957 describes a sag preventer for non-aqueous coating materials comprising a mixture of two different fatty acid amides wherein fatty acid amide (A) is obtained by reacting a mixture of at least one straight chain saturated fatty acid having 3–4 carbon atoms and 12-hydroxystearic acid (the molar ratio of the fatty acid and 12-hydroxystearic acid being 1:9–8:1) and ethylene diamine or hexamethylene diamine and fatty acid amide (B) is obtained by reacting a mixture of at least one straight chain saturated fatty acid having 6–22 carbon atoms and 12-hydroxystearic acid (the molar ratio of the fatty acid and 12-hydroxystearic acid being 0:1–8:2) and ethylene diamine or hexamethylene diamine, wherein the weight ratio of fatty acid amide (A) to fatty acid amide (B) is 100:00 20:80.

U. S. Pat. No. 3,252,820 describes a rheological composition containing a thixotrophic castor wax derived from glyceryl trihydroxystearate. Rheox, Inc., assignee hereof, offers for sale as a commercial product a rheological additive designated THIXCIN R which is based on castor wax as well as other products based on low hydroxyl value castor wax. Rheox also offers for sale products utilizing castor wax and extenders such as clay and aluminum silicate.

U.S. Pat. No. 4,631,136 describes plant or vegetable oil-based drilling fluids containing a minor amount of a viscosifier consisting of an amine-treated bentonite clay. European Patent No. 00583285 B1 teaches use of clays treated with ester quaternary compounds to improve their oil wettability and the use of such clays to prepare rheological additives for water/oil invert emulsion drilling fluids. The patent gives examples of the clay being used together with fully hydrogenated castor oil, i.e. castor wax.

SUMMARY OF THE INVENTION

This invention is a new process for improving the rheological properties of oil based well drilling fluids particularly useful for oil-based invert emulsion types of drilling fluids. The new process uses as a rheological viscosifer a composition which is a mixture of organoclay or organoclays and a castor oil derivative, that is castorwax or, more generally, castor wax type rheological additives. The mixture when added to a drilling fluid from about 0.5 and 5% by weight creates an inventive drilling fluid composition less sensitive to the variety of different and varying very hot and very cold temperatures found in the drilling hole, the long stem of drilling pipe and the annulus. The composition is particularly useful when drilling in deep water from an off-shore drilling rig.

The present invention relates to the discovery of oil based drilling fluids particularly oil based invert emulsion drilling fluids that exhibit greater efficiency and provides more stable drilling fluid viscosity and anti-settling performance over varying temperatures when compared to conventional fluids containing only organoclays as the rheological additive. Conventional organophilic clays, when used as rheological additives in oil based invert muds, display marked viscosity increases in the mud when these muds are cooled through the temperature range found today in deep water, whereas muds prepared according to the present invention are dramatically more viscosity stable over the same temperature ranges. As a result, the fluids of this invention are ideal candidates for reduced temperature applications such as deep water drilling and directional drilling.

Organoclays, also known as organophilic clays, are the reaction product of smectite-type clays (most often bentonite and hectorite) and quaternary ammonium compounds (also called cationic organic salts). Castor wax type rheological additives are derivatives of castor oil produced by the controlled hydrogenation of castor oil—the principal chemical ingredient of castor wax is the glyceride of 12-hydroxystearic acid.

DESCRIPTION OF THE PREFERRED EMBODIMENTS

The present invention involves a process for providing rheology and anti-settling properties to oil based drilling fluids by adding to such fluid systems both organoclay and castor wax type rheological additives. The invention also includes novel drilling fluids containing such rheological additives.

The fluids of this invention will be used primarily as oil based drilling fluids and most particularly for oil based invert emulsion drilling fluids employed in deepwater drilling applications, although they could also find utility in a wide range of other oil based drilling fluids. The term oil based drilling fluid is defined as a drilling fluid in which the continuous phase is hydrocarbon based. Oil based fluids containing over 5% water are classified as oil based invert emulsion drilling fluids. Commonly, oil based invert emulsion drilling fluids will contain water as the discontinuous phase in any proportion up to about 50%.

The preferred well bore fluids of the invention are oil based invert emulsions. Such fluids have an oil "continuous" phase and an aqueous internal phase. The term "emulsion" is commonly used to describe systems in which water is the external or continuous phase and oil is dispersed within the external phase. By the term "invert" is meant that the hydrocarbon—oil substance is the continuous or external phase and that an aqueous fluid is the internal phase.

Water in the form of brine is most often used in forming the internal phase of these type fluids. Water can be defined as an aqueous solution which can contain from about 10 to 350,000 parts per million of metal ions such as lithium, sodium, potassium, magnesium, or calcium ions. The preferred brines used to form the internal phase of the preferred fluid of the invention contains from about 5 to about 25% (saturated) by weight calcium chloride and may contain various amounts of other dissolved salts such as sodium bicarbonate, sodium sulfate, sodium acetate, sodium borate, potassium chloride, or sodium chloride.

The ratio of water (brine) to oil in the emulsions of the invention should generally provide as high a brine content as possible while still maintaining a stable emulsion since a high water content drilling fluid is less expensive and less objectionable to work with than a drilling fluid containing a low water content. Oil/brine ratios in the range from about 80 to 20 to 50 to 50 have been found to work satisfactorily, depending upon the particular oil chosen. Thus the water content of a typical drilling fluid prepared according to the teachings of the invention will have an aqueous (water) content of about 5 to 50 volume percent, with the most preferred range being about 20 to 40 volume percent, most preferably about 30 volume percent of the drilling fluid.

In order to form a stable emulsion, a surfactant or emulsifier can also be added to the external, the internal or both phases. The emulsifier is preferably selected from a number of organic acids which are familiar to those skilled in the drilling fluid area, including the monocarboxyl alkanoic, alkenoic, or alkynoic fatty acids containing from 3 to 20 carbon atoms, and mixtures thereof. Examples of this group of acids include acetic, stearic, oleic, caproic, capric, butyric, behenic, palmitic, arachidic, myristoleixc, palmitoleic, elaidic, linoleic, linolenic, elaceostearic, and tarinic. Adipic acid, a member of the aliphatic dicarboxylic acids can also be used. More preferred surfactants or emulsifiers include lime, fatty acid calcium salts and lecithin.

Weighting materials are also used to weight the well bore fluids of the invention to a density in the preferred range from about 8 pounds per gallon to 18 pounds per gallon and greater. Weighting materials well known in the art include barite, ilmenite, calcium carbonate, iron oxide and lead sulfide. The preferred weighting material is commercially available barite.

Invert emulsion drilling fluids are described at length in U.S. Pat. No. 4,435,636, obtained by NL Industries, Inc., a predecessor of Rheox, Inc., the assignee on this invention.

In one embodiment the present invention provides a process for providing less temperature dependant rheological properties to an oil based drilling fluid of the type used in directional and deep water drilling operations comprising:
   a) preparing an oil based drilling fluid base composition; and
   b) incorporating into such an oil based drilling fluid base composition;
      i) one or more organoclays and
      ii) one or more castor wax type rheological additives.

The method of this invention could also find utility to prepare other non-aqueous fluid systems where improved viscosity stability over a range of temperatures is required.

In another embodiment the present invention involves an oil based drilling fluid comprising:
   a) an oil based drilling fluid base composition;
   b) one or more organoclays made as described hereafter and
   c) one or more castor wax type rheological additives.

Component a), an oil based drilling fluid base composition, is a drilling fluid in which the continuous phase is hydrocarbon-based. Oil based fluids containing over 5% water are defined for purpose of this invention as oil based invert emulsion drilling fluids.

The preferred base fluid compositions of this invention are oil based invert emulsions. Such fluids have an oil "continuous" phase and an aqueous internal phase.

Commonly, oil based invert emulsion drilling fluids will contain water as the discontinuous phase in any proportion up to about 50%. For background the term "emulsion" is used to describe systems in which water is the external or continuous phase and oil is dispersed within the external phase. By the term "invert" is meant that the hydrocarbon-oil substance is the continuous or external phase and that an aqueous fluid is the internal phase. Water in the form of brine is often used in forming the internal phase of these type base fluids.

Component b), one or more organoclays, are organoclays made from reaction of a smectite clay and one or more quaternary ammonium compounds. Organoclays are formed using water swellable smectite clays (most often bentonite or hectorite) which are reacted with quaternary ammonium compounds. Organoclays and their manufacture are described at length in several prior art patents issued to the assignee herein including U. S. Pat. Nos. 4,664,820, 4,517,112, 5,034,136 and 5,336,647, the teachings of which are incorporated by reference.

A preferred modified smectite-type organoclay particularly for one embodiment of the instant invention comprises the reaction product of:
   (a) a smectite-type clay having a cation exchange capacity of at least 50 milliequivalents per 100 grams of pure clay; and
   (b) one or more quaternary ammonium compounds in an amount of from about 40% to about 200% of the cation exchange capacity of the smectite-type clay.

The smectite-type clay can be sheared in slurry form prior to reaction with the quaternary ammonium salt, or treated in solid form with a pugmill or similar apparatus.

Smectite-type clays are well-known in the art and are commercially available from a variety of sources. Prior to use in the invention, the clays are preferably converted to the sodium form if they are not already in this form. This may be conveniently carried out by preparing an aqueous clay slurry and passing the slurry through a bed of cation exchange resin in the sodium form. Alternatively, the clay can be mixed with water and a soluble sodium compound, such as sodium carbonate, sodium hydroxide, etc., and the mixture sheared, such as with a pugmill or extruder.

The clays which may be used in the present invention to prepare the organoclay component of the inventive drilling fluid are smectite-type clays having a cationic exchange capacity of at least 50 milliequivalents per 100 grams of clay, 100% active clay basis, as determined by the well-known ammonium acetate or methylene blue methods.

Representative smectite or smectite-type clays useful in accordance with the present invention are the following:

Bentonite

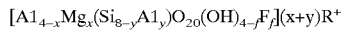

where $0<x<1.10$, $0<y<1.10$, $0.55 \leq (x+y) \leq 1.10$, $f \leq 4$ and R is selected from the group consisting of Na, Li, $NH_4$, and mixtures thereof, Hectorite

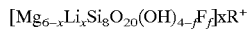

where $0.57 \leq x \leq 1.15$, $f \leq 4$ and R is selected from the group consisting of Na, Li, $NH_4$, and mixtures thereof, Montmorillonite

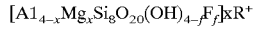

where $0.55 \leq x \leq 1.10$, $f \leq 4$ and R is selected from the group consisting of Na, Li, $NH_4$, and mixtures thereof, Beidellite

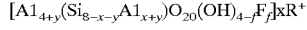

where $0.55 \leq x \leq 1.10$, $0 \leq y \leq 0.44$, $f \leq 4$ and R is selected from the group consisting of Na, Li, $NH_4$, and mixtures thereof;

Stevensite

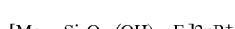

where $0.28 \leq x \leq 0.57$, $f=4$ and R is selected from the group consisting of Na, Li, $NH_4$, mixtures thereof.

The preferred smectite-type clay used in the present invention to make the organoclay used in this invention are bentonite and hectorite. Bentonite and its properties are described at length in the chapter entitled "Bentonite," in Carr, D., ed. 1994, *Industrial Minerals and Rocks* 6th Edition (published by the Society For Mining, Metallurgy and Exploration, Colorado). A description of hectorite can be found in *Clay Mineralogy* by Ralph E. Grim, $2^{nd}$ Edition (published by McGraw Hill).

It will be understood that both sheared and non-sheared forms of the above-listed smectite clays may be employed. In addition, the smectite clay employed can be either crude (containing gangue or non-clay material) or beneficiated (gangue removed). The ability to use crude clay as the smectite-type clay for this invention represents a substantial cost savings, since the clay beneficiation process and conversion to the sodium form do not have to be carried out.

The organoclay can be prepared by admixing a smectite-type clay, one or more quaternary ammonium compounds and water together, preferably at temperatures with the range of from 20° C. to 100° C., and most preferably from 35° C. to 80° C., for a period of time sufficient for the organic compound to react with the clay. The reaction is followed by filtering, washing, drying and grinding the organoclay product.

The clay is preferably dispersed in water at a concentration of from about 1 to 80%, most preferably from about 2 to 8% by weight. Optionally, the slurry may be centrifuged to remove non-clay impurities which constitute about 10% to 50% of the starting clay composition.

Quaternary ammonium compounds or salts which are useful to make specific organoclays for use with one aspect of the invention hereof are those having the formula:

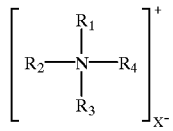

wherein $R_1$ comprises a linear or branched aliphatic or aromatic hydrocarbon group having from 8 to about 30 carbon atoms; $R_2$, $R_3$ and $R_4$ are independently selected from the group consisting of (a) $R_1$ group(s), (b) lineal or branched aliphatic or aromatic groups having from 1 to about 30 carbon atoms; (c) ethoxylated groups containing from 1 to about 80 moles of ethylene oxide; and (d) hydrogen; and $X^-$ comprises an anion, preferably chloride.

The raw materials used to make the quaternary ammonium compounds can be derived from natural oils such as tallow, soya, coconut and palm oil. The aliphatic groups in the above formula may also be derived from other naturally occurring oils including various vegetable oils, such as corn oil, coconut oil, soybean oil, cottonseed oil, castor oil and the like, as well as various animal oils or fats. The aliphatic groups may likewise be petrochemically derived from, for example, alpha olefins. Representative examples of useful branched, saturated radicals included 12-methylstearyl and 12-ethylstearyl.

Examples of useful aromatic groups in addition to a benzyl group, are benzyl and substituted benzyl moieties, include materials derived from, e.g., benzyl halides, benzhydryl halides, trityl halides, α-halo-α-phenylalkanes wherein the alkyl chain has from 1 to 22 carbon atoms, such as 1-halo-1-phenyloctadecane; substituted benzyl moieties, such as those derived from ortho-, meta- and para-chlorobenzyl halides, para-methoxybenzyl halides, ortho-, meta- and para-nitrilobenzyl halides, and ortho-, meta- and para-alkylbenzyl halides wherein the alkyl chain contains from 1 to 22 carbon atoms; and fused ring benzyl-type moieties, such as those derived from 2-halomethylnaphthalene, 9-halomethylanthracene and 9-halomethylphenathrene, wherein the halo group comprises chloro, bromo, or any other such group which serves as a leaving group in the nucleophilic attack of the benzyl type moiety such that the nucleophile replaces the leaving group on the benzyl type moiety.

Additional useful aromatic-type substituents include phenyl and substituted phenyl, N-alkyl and N,N-dialkyl anilines, wherein the alkyl groups contain between 1 and 22 carbon atoms; ortho-, meta- and para-nitrophenyl, ortho-, meta- and para-alkyl phenyl, wherein the alkyl group contains between 1 and 22 carbon atoms, 2-,3-, and 4-halophenyl wherein the halo group is defined as chloro, bromo, or iodo, and 2-, 3-, and 4-carboxyphenyl, aryl such as phenol, or aralkyl such as benzyl alcohols; and fused ring aryl moieties such as naphthalene, anthracene, and phenanthrene.

Useful quaternary ammonium salts for purposes of the instant invention include hydrophobic quaternary ammonium salts, such as monomethyl trialkyl quaternaries and dimethyl dialkyl quaternaries, as well as hydrophilic quaternary ammonium salts, such as water-dispersible, ethoxylated quaternary ammonium compounds, and mixtures thereof.

Some examples of suitable hydrophobic quaternary ammonium compounds to make organoclays useful for this invention are:

Methyl trihydrogenated tallow ammonium chloride (M3HT):

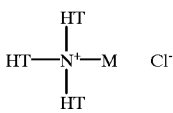

Dimethyl dihydrogenated tallow ammonium chloride (2M2HT):

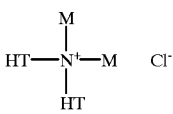

Methyl benzyl dihydrogenated tallow ammonium chloride (MB2HT):

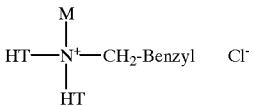

Dimethyl dibehenyl ammonium chloride:

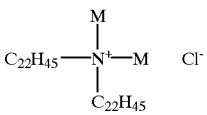

Trimethyl hydrogenated tallow ammonium chloride (3MHT):

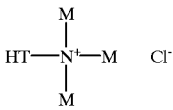

wherein HT=hydrogenated tallow and M=methyl, $CH_3-$.

While not wishing to be bound by theory, the above described quaternary compounds were employed to make the novel drilling fluids of this invention since it is believed they produce organoclays having superior compatability and efficiency in synergy, with the castor wax rheological additive compound, when dispersed in fluids of the type which form the base of most commercial oil based drilling fluids.

The preparation of the quaternary ammonium compounds utilized to prepare the inventive formulations and processes can be carried out by techniques well-known in the art. For example, when preparing a quaternary ammonium salt, one skilled in the art would prepare a dialkyl secondary amine, for example, by the hydrogenation of nitrites (see U.S. Pat. No. 2,355,356), and then form the methyl dialkyl tertiary amine by reductive alkylation using formaldehyde as a source of the methyl radical. According to procedures set forth in U.S. Pat. Nos. 3,136,819 and 2,775,617, a quaternary amine halide may then be formed by adding benzyl chloride or benzyl bromide to the tertiary amine. The disclosure of the above three patents are incorporated herein by reference. See also recent U.S. Pat. No. 5,634,969 which describes in detail the most current and up-to-date procedures used to make quaternary ammonium compounds.

Preferred quaternary ammonium compounds useful for preparing the organoclays of this invention are methyl trihydrogenated tallow ammonium chloride (M3HT) and dimethyl dihydrogenated tallow ammonium chloride (2M2HT).

When an organically modified smectite-type clay is employed in the invention, the clay is preferably selected from the group consisting of crude hectorite, crude bentonite, beneficiated hectorite, beneficiated bentonite, spray dried hectorite and mixtures thereof.

Component c) is a derivative of castor oil, most particularly castor wax, and more broadly castor wax type rheological additives.

The molecular structure of castor oil permits the creation of a large number of chemical products by innumerable and various reactions. It has been known for some time that castor products derived from the castor bean plant and oil obtained from the bean can be formed into a large variety of derivatives; one such important commercial product consisting of fully hydrogenated castor oil has been designated by the industry by use of the term castor wax.

Castor wax is a synthetic, waxlike compound obtained by the full hydrogenation of natural castor oil. Its principal constituent is the glyceride of 12-hydroxystearic acid. There also may be present minor quantities of mixed glycerides of this acid, dihydroxystearic and stearic acids and other substances. Castor wax has a high melting point (~87° C.), is odorless (faint fatty or waxy odor) and is generally considered non-toxic and environmentally benign. Castor wax is often produced by manufacturers in the form of uniform, free-flowing, white flakes. When liquid at elevated temperature, castor wax is clear, transparent, very fluid, largely colorless, uniform in composition and free from extraneous matter.

Castor wax is hard in comparison with most other waxes. Its penetration value (Penetrometer Needle No. 14 with 100 grams weight) is 0.2 mm as compared with a value of 0.1 for carnauba wax and 1.7 for beeswax.

Castor wax is highly miscible with abietyl alcohol, hydroabietyl alcohols, chlorinated aromatics, ethyl cellulose, rosin, cellulose acetate butyrate, and polybutyl and polyisobutyl methacrylates, and is moderately miscible with ester gums and coumarone indene resins.

In addition to castor wax, there are also available a series of partially hydrogenated castor oils of intermediate melting points which are wax-like. These partially hydrogenerated castor wax products are included within the definition of castor wax type rheological additives. These additives of lower melting point may differ in composition from the castor wax described above by containing lower percentages of glyceryl trihydroxystearate. As the content of this saturated fatty acid glyceride is reduced, there is a corresponding lowering of the melting point of the product.

The application of castor wax type rheological additives in this invention to deep water drilling takes advantage of a peculiar, relatively unknown, attribute of castor wax type rheological additives. This property of these castor wax type additives are their reduced solubility in liquid organic systems at moderate temperatures. Such castor wax type additives become more dissolvable in a organic system at more elevated temperatures—such solutions on cooling therefore form gel-like masses.

Partially hydrogenated castor wax type rheological additives are slightly more compatible and soluble than castor wax. They have been found to have utility in those applications where some sacrifice in settling can be tolerated to achieve better compatibility and solubility.

The molecular structure of natural castor oil is a triglyeride with three pendant carbon chains. Generally, each carbon has a double bond at the 9,10 position and a hydroxyl group on the $12^{th}$ carbon. Castor oil in nature has a hydroxyl value of approximately 160–168 with a fatty acid distribution of approximately 89% $C_{18}OH$ and 9% $C_{18}$; that is, not all the carbon chain lengths in natural or untreated castor oil contain an OH group; only about 90% of said chains on average do so.

Castor wax is produced from castor oil by hydrogenation, and can be described as essentially a fully hydrogenated molecule having no appreciable change in hydroxyl value versus the natural hydroxyl value of castor oil from which it was made. Castor oil has a natural hydroxyl value in the range of 160–168. Hydrogenation can be accomplished by many known methods and can occur as part of or distinct from other reactions involving castor oil, for example sulfonation (a reaction of castor oil with sulfuric acid) and dehydration. Hydrogenation can be partial or substantially complete as described above.

Processes of dehydrating castor oil are well known. See for example Government of India Patent No. 137,507; see also, *A Continous Process for the Dehydration of Castor Oil*, The Journal of the American Oil Chemists Society, August 1948 at pages 268–271. Other castor synthesis procedures described in the literature indicate that varying processing parameters such as hydrogen pressure, dosage of fresh nickel catalyst, temperature and reaction time employed during hydrogenation of castor oil can influence hydroxyl value to yield the castor wax type rheological additive compositions useful for this invention.

The term castor wax type rheological additive, as used herein, includes fully and partially hydrogenated and/or hydroxylated castor oil. Thixcin R, castor wax made by Rheox, Inc., was found to be particularly effective as component c).

A preferred additive to prepare the novel fluids of this invention are use of a 50—50 organophilic clay/castor wax type rheological additive mixture. The preferred range of organophilic clay/castorwax type rheological additive ratios is from above 90/10 to 20/80 organophilic clay/castorwax type rheological additive. All proportions are by weight.

Preferred organophilic clays used to prepare the additives of this invention include BENTONE 38 (2M2HT quaternary/hectorite clay), BENTONE 155 (2M2HT quaternary/bentonite clay) and BENTONE 128 (MB2HT quaternary/bentonite clay). Other organoclays composed of both different quaternary ammonium salts or other types of smectite clay, can also be used. The prepared castorwax component used to prepare the preferred additives of this invention is hydrogenated castor oil, although similar types of castor oil derivatives, such as low hydroxyl castorwax type rheological additive as described in U.S. Pat. No. 5,340,390 can also be employed.

A number of other additives besides rheological additives regulating viscosity and anti-settling properties, providing other properties, can be used in the fluid so as to obtain desired application properties, such as, for example, emulsifiers or emulsifier systems, weighting agents, fluid loss-prevention additives and wetting additives.

The fluids of this invention can be prepared by simple dry blending the organophilic clay or clays and castorwax type rheological additive(s) as powders together at the proper weight ratio into the drilling fluid or these powdered components can be added separately to the fluid. Alternately, these components can also be mixed together and then ground.

A process for preparing invert emulsion drilling fluids (oil muds) involves using a mixing device to incorporate the individual components making up that fluid. Primary and secondary emulsifiers and wetting agents (surfactant mix) are added to the base oil (continuous phase) under moderate agitation. The water phase, typically a brine, is added to the base oil/surfactant mix along with alkalinity control agents and acid gas scavengers. Rheological additives as well as fluid loss control materials, weighting agents and corrision inbihition chemicals are also included, and the agitation continued to ensure dispersion of each ingredient and homogenity of the resulting fluidizied mixture.

As discussed herein, the use of the term oil based drilling fluid base composition is defined to mean the base oil plus all other ingredients making up the drilling mud except for the organoclay and castor wax-type rheological agents. Note that the order of addition of the rheological additives can be strictly random, i.e. they can be added in any order, and the organoclay and castor wax type rheological additives may be pre-blended before incorporation or added separately. Such two component mixtures can be added to the base drilling fluid using the wide variety of mixing manufacturing techniques known to the art and to technicians working in the field.

Drilling fluids of this invention display lessened viscosity build as the drilling fluid is cooled from a temperature of as high as 200° C. to as low as 5° C. with a preferred range of from 60° C. to 5° C.

A means of measuring the effect of temperature on fluid viscosity is by use of a low temperature viscosity factor measurement (LTVF). LTVF is determined by dividing the Brookfield viscosity obtained for the drilling fluid at 40° F. (4.4° C.) by the viscosity obtained at 120° F. (48.9° C.), both values measured at the same shear rate; typically 3 rpm employing a Brookfield viscometer. The higher the LTVF, the greater the viscosity increase as the mud is cooled from 120° F. (48.9° C.) to 40° F. (4.4° C.). A value of 1 would indicate no viscosity change with varying temperature, the ideal viscosity performance. Data indicate a LTVF of approximately 10 for fluids thickened with the conventional organoclays, whereas the fluids thickened with the additive of this invention preferably display a LTVF of about 6 or less.

This reduced viscosity at low temperature translates into easier pumping, less of an increase in ECD and minimal drilling fluid losses to the formation. Although the use of the invention at low levels in drilling muds (3 lbs) has an efficiency approximately equal to conventional organoclays, at higher loadings, such as 6 lbs., efficiencies exceed 10% and can go as high as 40%, when efficiency relates to viscosity build.

The following examples are illustrations designed to assist those skilled in the drilling fluid art to practice the present invention, but are not intended to limit the wide scope of the invention. Various modifications and changes can be made without departing from the essence and spirit of the invention. The various chemicals used in the examples are commercial materials, except for the inventive drilling fluids.

EXAMPLE 1

Rheological additives composed of various proportions of BENTONE 155/THIXCIN R were evaluated for rheological performance in an 85/15 IAO invert emulsion drilling fluid (drilling fluid formula shown as Formulation A) using the process described below.

Formulation A

85/15 IAO Invert Emulsion Drilling Fluid Formulation
 185.5 g Isomerized-alpha olefin (IAO)
 8.0 g EZ Mul
 4.0 g Invermul
 75.0 g 30% $CaCl_2$ Brine
 4.0 g Lime
Mix 8 minutes Hamilton Beach high speed, then add
 3.0 g Rheological Additive
Mix 15 minutes Hamilton Beach high speed, then add
 8.0 g Duratone
 215.0 g Barite
Mix 10 minutes Hamilton Beach high speed All rheological additive candidates were employed at a 3 lb. loading. Initial mud viscosity was measured at 120° F. (48.9° C.). The muds were then hot rolled 16 hours at 150° F. (65.6° C.) and viscosity measured at 120° F. (48.9° C.) and 40° F. (4.4° C.). The muds were cooled to 40° F. (4.4° C.) by placing in a refrigerator overnight. Data observed is presented in Table I.

TABLE I

Drilling fluids containing various proportions of BENTONE 155/THIXCIN R evaluated at a 3 lb. loading

|  | 100% Bentone 155 | 75/25 Bentone 155/THIX.R | 50/50 Bentone 155/THIX.R | 25/75 Bentone 155/THIX.R | 100% THIXCIN R |
|---|---|---|---|---|---|
| Initial Viscosity 120 ° C. |  |  |  |  |  |
| Fann 600/300 rpm, dial reading | 52/31 | 49/29 | 48/28 | 44/25 | 45/26 |
| Fann 200/100 rpm, dial reading | 24/16 | 22/15 | 20/14 | 18/12 | 20/13 |
| Fann 6/3 rpm, dial reading | 6/6 | 6/5 | 5/4 | 4/3 | 4/4 |
| PV, cps | 21 | 20 | 20 | 19 | 19 |
| YP, #/100 $ft^2$ | 10 | 9 | 8 | 6 | 7 |
| 10 sec. Gel, #/100 $ft^2$ | 7 | 6 | 6 | 4 | 5 |
| Brookfield LVT 30 rpm, cps | 480 | 422 | 372 | 288 | 342 |
| 3 rpm, cps | 3030 | 2650 | 2270 | 1650 | 1880 |
| 0.3 rpm, cps | 18,700 | 16,100 | 14,000 | 8,300 | 8,400 |
| Electrical Stability, volts | 785 | 719 | 653 | 498 | 488 |
| Hot Rolled 16 Hours, 150° F. |  |  |  |  |  |

TABLE I-continued

Drilling fluids containing various proportions of BENTONE 155/THIXCIN R evaluated at a 3 lb. loading

|  | 100% Bentone 155 | 75/25 Bentone 155/THIX.R | 50/50 Bentone 155/THIX.R | 25/75 Bentone 155/THIX.R | 100% THIXCIN R |
|---|---|---|---|---|---|
| Initial Viscosity 120° F. | | | | | |
| Fann 600/300 rpm, dial reading | 56/34 | 53/32 | 52/31 | 49/28 | 55/30 |
| Fann 200/100 rpm, dial reading | 26/18 | 25/18 | 23/16 | 20/14 | 22/14 |
| Fann 6/3 rpm, dial reading | 8/7 | 7.5/7 | 6.5/6 | 5/4 | 4/3.5 |
| PV, cps | 22 | 21 | 21 | 21 | 25 |
| YP, #/100 ft$^2$ | 12 | 11 | 10 | 7 | 5 |
| 10 sec. Gel, #/100 ft$^2$ | 8 | 7 | 6 | 6 | 5 |
| Brookfield LVT 30 rpm, cps | 592 | 574 | 523 | 380 | 356 |
| 3 rpm, cps | 3,900 | 3,870 | 3,530 | 2,340 | 1,980 |
| 0.3 rpm, cps | 26,200 | 25,700 | 24,500 | 15,000 | 9,200 |
| Electrical Stability, volts | 949 | 888 | 727 | 541 | 479 |
| Hot Rolled 16 hours, 150° F. Viscosity 40° F. | | | | | |
| Fann 600/300 rpm, dial raading | 206/143 | 173/114 | 176/114 | 169/105 | 139/79 |
| Fann 200/100 rpm, dial reading | 114/80 | 89/62 | 89/60 | 77/48 | 56/31 |
| Fann 6/3 rpm, dial reading | 44/43 | 40/40 | 36/37 | 23/22 | 6.5/5.5 |
| PV, cps | 63 | 59 | 62 | 64 | 60 |
| YP, #/100 ft$^2$ | 80 | 55 | 52 | 41 | 19 |
| 10 sec. Gel, #100 ft$^2$ | 45 | 39 | 45 | 36 | 10 |
| Brookfield LVT 30 rpm, cps | 3,936 | 3,344 | 3,000 | 1,920 | 540 |
| 3 rpm, cps | 24,880 | 21,600 | 19,040 | 11,800 | 2,840 |
| 0.3 rpm, cps | 94,000 | 78,000 | 72,800 | 48,000 | 14,800 |
| Electrical Stability, volts | 1,597 | 1,214 | 893 | 500 | 197 |
| LTVF | 6.38 | 5.58 | 5.35 | 5.04 | 1.43 |

Discussion of Results

The above results indicate that fluids of the present invention containing 75/25 and 50/50 BENTONE 155/THIXCIN R provided nearly equal viscosity at 120° F. (48.9° C.) and about 15%–25% lower viscosity at 40° F. (4.4° C.) compared to that obtained for 100% BENTONE 155.

EXAMPLE 2

The rheological performance of fluids of this invention using 50/50 BENTONE 38/THIXCIN R, was compared to that obtained for standard BENTONE 38 in the 85/15 IAO invert emulsion mud formulation (Formula A). Both additives were employed at a 3 lb. loading. Viscosities of the fluid systems at 120° F. (48.9° C.) and 40° F. (4.4° C.) were measured after subjecting the muds to various hot roll and shearing treatments designed to simulate a mud circulation system. The results are shown in Table II.

TABLE II

Rheological performance of 50/50 BENTONE 38/THIXCIN R versus standard BENTONE 38 Fluids evaluated at a 3 lb. loading in an 85/15 IAO invert emulsion drilling fluid system

| SAMPLE | TEMP. | FANN VISCOSITY | | | | | | GEL | BROOKFIELD, LVT | | | LTVF |
|---|---|---|---|---|---|---|---|---|---|---|---|---|
| | | 600 | 300 | 6 | 3 | PV | YP | 10 SEC. | 39 | 3 | 0.3 | |
| *Initial Viscosity* | | | | | | | | | | | | |
| BENTONE 38 (B-38) | 120 F. | 42 | 23 | 3 | 3 | 19 | 4 | 4 | 253 | 1,560 | 9,300 | |
| 50/50 B-38/THIX.R | 120 F. | 41 | 22 | 3 | 3 | 19 | 3 | 4 | 238 | 1,370 | 7,900 | |
| *Hot Rolled @ 150 F. for 16 hours* | | | | | | | | | | | | |
| BENTONE 38 | 120 F. | 43 | 24 | 4 | 3 | 19 | 5 | 5 | 279 | 1,740 | 12,200 | |
| 50/50 B-38/THIX.R | 120 F. | 44 | 25 | 4 | 3.5 | 19 | 6 | 5 | 303 | 1,820 | 10,900 | |
| BENTONE 38 | 40 F. | 151 | 95 | 27 | 27 | 56 | 39 | 31 | 2,444 | 16,720 | 91,200 | 9.61 |
| 50/50 B-38/THIX.R | 40 F. | 122 | 70 | 10 | 10 | 52 | 18 | 15 | 836 | 5,680 | 25,600 | 3.12 |
| *Re-Hot Rolled @ 150 F. for 32 hours — Total 48 hours @ 150 F. Re-Mix 20 min. Hamilton Beach, High Speed* | | | | | | | | | | | | |
| BENTONE 38 | 120 F. | 48 | 27 | 5 | 4 | 21 | 6 | 5 | 359 | 2,250 | 14,700 | |
| 50/50 B-38/THIX.R | 120 F. | 48 | 27 | 5.5 | 5 | 21 | 6 | 6 | 406 | 2,550 | 16,300 | |

TABLE II-continued

Rheological performance of 50/50 BENTONE 38/THIXCIN R versus standard BENTONE 38
Fluids evaluated at a 3 lb. loading in an 85/15 IAO invert emulsion drilling fluid system

| | | FANN VISCOSITY | | | | | | GEL | BROOKFIELD, LVT | | | |
|---|---|---|---|---|---|---|---|---|---|---|---|---|
| SAMPLE | TEMP. | 600 | 300 | 6 | 3 | PV | YP | 10 SEC. | 39 | 3 | 0.3 | LTVF |
| | | Re-Hot Rolled @ 150 F. for 16 hours — Total 64 hours @ 150 F. | | | | | | | | | | |
| BENTONE 38 | 120 F. | 44 | 25 | 4 | 3.5 | 19 | 6 | 5 | 364 | 2,280 | 13,600 | |
| 50/50 B-38/THIX.R | 120 F. | 40 | 23 | 3 | 2.5 | 17 | 6 | 3 | 264 | 1,600 | 7,200 | |
| BENTONE 38 | 40 F. | 186 | 124 | 40 | 40 | 62 | 62 | 43 | 3,396 | 23,520 | 99,600 | 10.32 |
| 50/50 B-38/THIX.R | 40 F. | 125 | 73 | 9 | 9 | 52 | 21 | 12 | 776 | 5,120 | 27,600 | 3.20 |

Discussion of Results

Data presented in Table II again indicate that the fluids of this invention, containing 50/50 BENTONE 38/THIXCIN R, show similar viscosity at 120° F. (48.9° C.) and considerably lower viscosity at 40° F. (4.4° C.) compared to that obtained using standard BENTONE 38.

A means of measuring the effect of temperature on mud viscosity is a low temperature viscosity factor (LTVF). The LTVF is determined by dividing the Brookfield LVT 3 rpm viscosity obtained for the drilling fluid at 40° F. (4.4° C.) by the viscosity obtained at 120° F. (48.9° C.). The higher the LTVF, the greater the viscosity increase as the mud is cooled from 120° F. (48.9° C.) to 40° F. (4.4° C.). A value of 1 would indicate no viscosity change with varying temperature, the ideal viscosity performance. Data indicate a LTVF of approximately 10 for the mud thickened with the conventional organoclay, whereas the mud thickened with the additive of this invention displays a LTVF of about 3.

Thus, the fluids of this invention provide a considerable advantage over those using conventional organophilic clay when employed in deepwater drilling by yielding a mud that effectively suspends solids and remains easily pumpable over the wide range of cold and hot temperatures encountered during circulation.

Note that the substantial viscosity increase suffered by the conventional organoclay at low temperature would hinder mud pumpability, increase ECD and result in lost circulation in most deep water systems.

EXAMPLE 3

In this example, the rheological performance of fluids of this invention, containing various loadings of 50/50 BENTONE 38/THIXCIN R, was compared to that obtained for 6 lbs. of standard BENTONE 38. The fluids were evaluated using the 85/15 IAO invert emulsion mud (Formulation A). After preparation, the drilling fluids were hot rolled 16 hours at 150° F and remixed for 5 minutes using the Hamilton Beach Mixer at medium speed. The results are recorded in Table III.

TABLE III

Various Loadings of 50/50 BENTONE 38/THIXCIN R Versus 6 Lbs. Standard BENTONE 38
85/15 IAO Invert Emulsion Drilling Fluid. Viscosity at 120° F.

| MEASUREMENT | 6 Lb. B-38 | 6 Lb. 50/50 Bentone 38/ THIXCIN R | 5.5 Lb. 50/50 Bentone 38/ THIXCIN R | 5 Lb. 50/50 Bentone 38/ THIXCIN R | 4.3 Lb. 50/50 Bentone 38/ THIXCIN R | 3.6 Lb. 50/50 Bentone 38/ THIXCIN R |
|---|---|---|---|---|---|---|
| Fann 600/300 rpm | 65/40 | 106/76 | 94/66 | 99/71 | 74/49 | 64/42 |
| Fann 200/100 rpm | 32/23 | 64/50 | 55/43 | 60/47 | 39/29 | 34/25 |
| Fann 6/3 rpm | 11/10 | 27/25 | 23/21 | 26/24 | 14/13 | 11/10 |
| PV | 25 | 30 | 28 | 28 | 25 | 22 |
| YP | 15 | 46 | 38 | 43 | 24 | 20 |
| 10 Sec. Gel | 10 | 25 | 20 | 23 | 13 | 10 |
| Brookfield LVT 30 rpm | 788 | 2,200 | 1,816 | 2,172 | 1,228 | 944 |
| Brookfield LVT 3 rpm | 5,480 | 13,600 | 12,120 | 13,280 | 8,200 | 6,320 |
| Brookfield LVT 0.3 rpm | 32,800 | 32,800 | 38,400 | 36,000 | 33,200 | 17,200 |

Discussion of Results

Viscosities measured at 120° F. (48.9° C.) (Table III) indicate that fluids with 3.6 lbs. of 50/50 BENTONE 38/THIXCIN R have similar viscosity as those containing 6 lbs. of standard BENTONE 38. Thus, this data indicate that the additive of this invention is approximately 40% more efficient than the conventional organophilic clay.

EXAMPLE 4

This example focused measurement at a temperature of 40° F. (4.4° C.). Viscosities measured at 40° F. (4.4° C.) again indicate considerably less viscosity build on cooling for the fluids of this invention compared to conventional organophilic clays—see Table IV.

TABLE IV

| | BENTONE 38 @ 6.0 Lbs/Bbl | | | | 50/50 BENTONE 38/THIXCIN R @ 3.6 Lbs/Bbl | | | |
|---|---|---|---|---|---|---|---|---|
| | 120° F. | 1 Hour 40° F. | 4 Hours 40° F. | 16 Hours 40° F. | 120° F. | 1 Hour 40° F. | 4 Hours 40° F. | 16 Hours 40° F. |
| Fann Viscosity | | | | | | | | |
| 600 rpm | 65 | 215 | 258 | 208 | 64 | 174 | 203 | 186 |
| 300 rpm | 40 | 148 | 176 | 154 | 42 | 117 | 128 | 119 |
| 200 rpm | 32 | 120 | 140 | 124 | 34 | 94 | 99 | 93 |
| 100 rpm | 23 | 88 | 101 | 89 | 25 | 69 | 69 | 65 |
| 6 rpm | 11 | 47 | 51 | 43 | 11 | 46 | 45 | 42 |
| 3 rpm | 10 | 46 | 49 | 43 | 10 | 46 | 45 | 42 |
| PV | 25 | 67 | 82 | 54 | 22 | 57 | 75 | 67 |
| YP | 15 | 81 | 94 | 100 | 20 | 60 | 53 | 52 |
| 10 Sec. Gel | 10 | 44 | 47 | 43 | 10 | 45 | 46 | 42 |
| BROOKFIELD LVT VISCOSITY | | | | | | | | |
| 30 rpm | 788 | 8,940 | 6,660 | 5,340 | 944 | 4,900 | 4,860 | 4,300 |
| 3 rpm | 5,480 | 59,400 | 48,000 | 41,400 | 6,320 | 23,000 | 22,400 | 22,000 |
| 0.3 rpm | 32,800 | 250,000 | 192,000 | 153,000 | 17,200 | 102,000 | 80,000 | 76,000 |
| LTVF | — | 10.84 | 8.76 | 7.55 | — | 3.64 | 3.54 | 3.48 |
| ECD, Calculated | 12.13 | | 12.49 | | 12.14 | | 12.31 | |

Note: 50/50 B-38/THIXCIN R at 3.6 Lbs/bbl had a 47.2% decrease in delta ECD at reduced temperatures.

Discussion of Results

The fluid of this example also had a 47.2% decrease in delta ECD at reduced temperatures. ECD is calculated using standard equations found in API Bulletins, API Bulletin 13D, Second Edition May 15, 1985 "The Rheology of Oil Well Drilling Fluids".

The foregoing background, description and examples have been set forth merely to illustrate the invention and are not intended to be limiting. Since many modifications and simple changes of the disclosed embodiments incorporating the spirit and substance of the invention may occur to persons skilled in the art, the invention should be construed to include everything within the scope of the appended claims, equivalents thereof and obvious variations thereof.

What is claimed is:

1. An oil based drilling fluid comprising:
   a) an oil drilling base fluid,
   b) one or more organoclays prepared by the reaction of smectite clay and one or more quaternary ammonium compounds having the chemical formula:

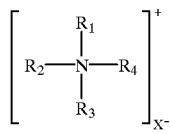

wherein $R_1$ comprises a linear or branched aliphatic hydrocarbon group having from 8 to 30 carbon atoms; $R_2$, $R_3$ and $R_4$ are independently selected from the group consisting of (a) $R_1$ group(s), (b) linear or branched aliphatic groups having from 1 to 30 carbon atoms or a linear or branched aromatic hydrocarbon group having 6 to 30 carbon atoms; (c) ethoxylated groups containing from 1 to 80 moles of ethylene oxide; and (d) hydrogen; and $X^{31}$ comprises an anion, and
   c) one or more castor wax rheological additives,
wherein said fluid exhibits less temperature dependent rheological properties at temperatures below 120° F.

2. The fluid of claim 1 wherein the oil based drilling fluid is an oil based invert emulsion drilling fluid.

3. The fluid of claim 1 wherein the drilling fluid has a low temperature viscosity measurement factor of 6 or less.

4. The fluid of claim 1 wherein the organoclay is the reaction product of a smectite clay selected from the group consisting of crude hectorite, crude bentonite, beneficiated hectorite, beneficiated bentonite, spray dried hectorite and mixtures thereof and a quaternary ammonium compound.

5. The fluid of claim 4 wherein the smectite clay is bentonite.

6. The fluid of claim 1 wherein one or more of the quaternary ammonium compounds is selected from the group consisting of methyl trihydrogenated tallow ammonium chloride, dimethyl dihydrogenated tallow ammonium chloride, methyl benzyl dihydrogenated tallow ammonium chloride and trimethyl hydrogenated tallow ammonium chloride.

7. The fluid of claim 1 wherein the fluid exhibits a decrease in delta equivalent circulating density of 10% or greater compared to a fluid containing only organoclay as a viscosifier.

8. The fluid of claim 1 wherein the fluid exhibits increased efficiency greater than 10% compared to a fluid containing only organoclay as a viscosifier.

9. A process for providing an oil based drilling fluid with a low temperature viscosity factor measurement of 6 or less comprising:
   1) preparing an oil based drilling fluid base composition; and
   2) incorporating into such drilling fluid base composition:
      1) one or more organoclays prepared by the reaction of smectite clay and one or more quaternary ammonium compounds, and
      2) one or more castor wax rheological additives.

10. The process of claim 9 wherein the oil based drilling fluid is an oil based invert emulsion drilling fluid.

11. The process of claim 9 wherein the organoclay is the reaction product of a smectite clay selected from the group consisting of crude hectorite, crude bentonite, beneficiated hectorite, beneficiated bentonite, spray dried hectorite and mixtures thereof and a quaternary ammonium compound.

12. The process of claim 11 wherein one or more of the quaternary ammonium compounds used to make the organoclay has the chemical formula:

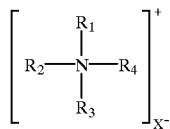

wherein $R_1$ comprises a linear or branched aliphatic hydrocarbon group having from 8 to 30 carbon atoms; $R_2$, $R_3$ and $R_4$ are independently selected from the group consisting of (a) $R_1$ group(s), (b) linear or branched aliphatic groups having from 1 to 30 carbon atoms or a linear or branched aromatic hydrocarbon group having 6 to 30 carbon atoms; (c) ethoxylated groups containing from 1 to 80 moles of ethylene oxide; and (d) hydrogen; and X– comprises an anion.

13. The process of claim 9 wherein the oil based drilling fluid exhibits a decrease in delta equivalent circulating density at temperatures of 120° F. and less of 10% or greater.

14. The process of claim 9 wherein the oil based drilling fluid exhibits increased efficiency greater than 10% compared to a drilling fluid containing only organoclay as a viscosifier.

15. An oil based drilling fluid comprising:
   a) an oil drilling base fluid,
   b) one or more organoclays prepared by the reaction of smectite clay and a quaternary ammonium compound selected from the group consisting of methyl trihydrogenated tallow ammonium chloride, dimethyl dihydrogenated tallow ammonium chloride, methyl benzyl dihydrogenated tallow ammonium chloride and trimethyl hydrogenated tallow ammonium chloride, and
   c) one or more castor wax rheological additives,
wherein said fluid exhibits less temperature dependent rheological properties at temperatures below 120° F.

16. The fluid of claim 15 wherein the drilling fluid has a low temperature viscosity measurement factor of 6 or less.

17. The fluid of claim 15 wherein the organoclay is the reaction product of a smectite clay selected from the group consisting of crude hectorite, crude bentonite, beneficiated hectorite, beneficiated bentonite, spray dried hectorite and mixtures thereof and a quaternary ammonium compound.

18. The fluid of claim 17 wherein the smectite clay is bentonite.

19. The oil based drilling fluid of claim 1, wherein $X^-$ is chloride.

20. The process of claim 12, wherein $X^{31}$ is chloride.

* * * * *

UNITED STATES PATENT AND TRADEMARK OFFICE
CERTIFICATE OF CORRECTION

PATENT NO.    : 6,187,719 B1
DATED         : February 13, 2001
INVENTOR(S)   : David Dino, Charles Cody, Edward Magauran and Araxi Chiavoni It is certified that error appears in the above-identified patent and that said Letters Patent is hereby corrected as shown below:

Column 19,
Lines 46-53, change

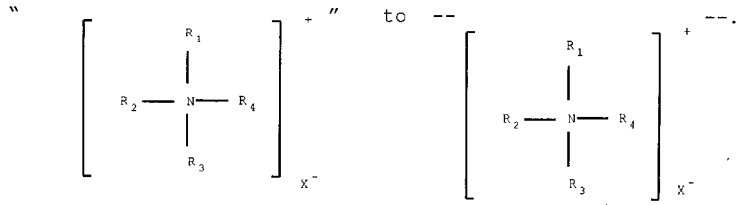

Line 61, change "$X^{31}$" to -- $X^-$ --.

Column 21,
Lines 4-10, change

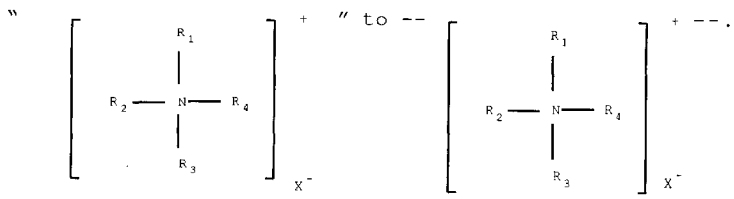

Line 19, change "X-" to -- $X^-$ --

Column 22,
Line 25, change "$X^{31}$" to -- $X^-$ --.

Signed and Sealed this

Tenth Day of September, 2002

*Attest:*

*Attesting Officer*

JAMES E. ROGAN
*Director of the United States Patent and Trademark Office*